Patented Aug. 8, 1950

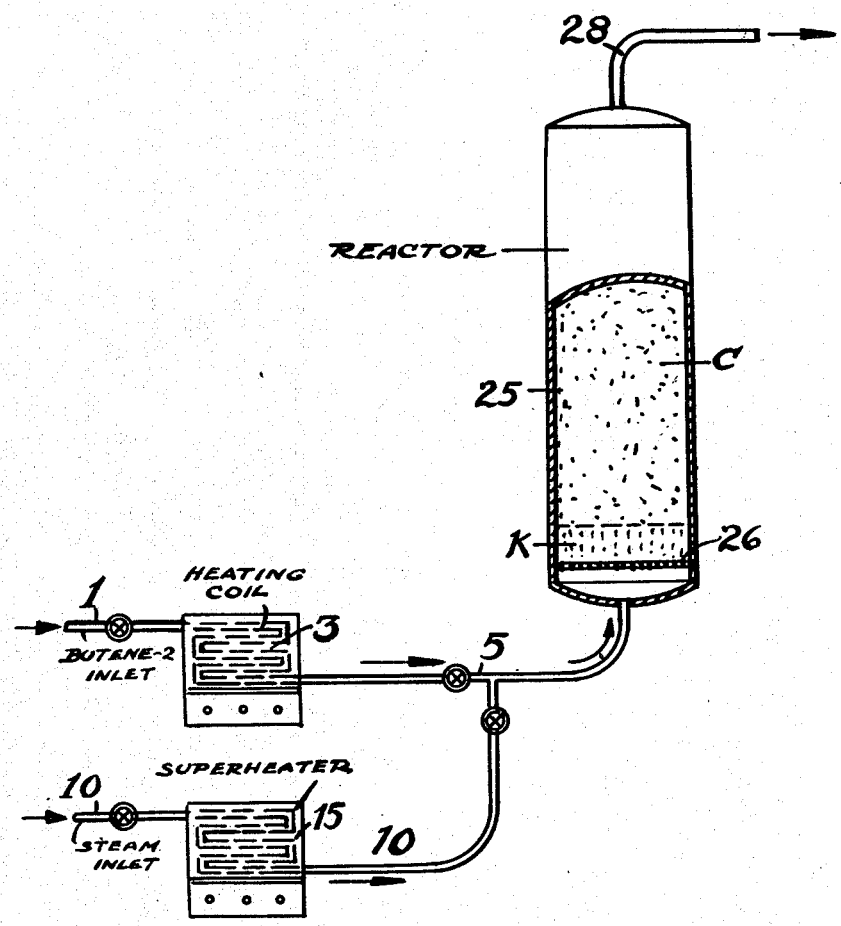

2,518,354

UNITED STATES PATENT OFFICE 2,518,354

METHOD OF MAINTAINING CATALYST ACTIVITY IN A DEHYDROGENATION PROCESS

Richard N. Meinert, Westfield, and Hans G. Vesterdal, Elizabeth, N. J., assignors to Standard Oil Development Company, a corporation of Delaware Application March 24, 1943, Serial No. 480,288

5 Claims. (Cl. 260—680)

1

The present invention relates to improvements in the dehydrogenation of mono-olefins and/or alkylated aromatics and, more particularly, it relates to improvements in the catalytic dehydrogenation of such compounds in the presence of a catalyst consisting of iron oxide, magnesium oxide, copper oxide and potassium oxide, such as disclosed in the prior application of Kenneth K. Kearby, Serial No. 430,873, filed February 14, 1942, Patent No. 2,395,875.

The production of butadiene has acquired considerable commercial importance recently and several new methods have been devised for producing this diolefin which is useful as an intermediate in the production of rubber substitutes and rubber-like materials. Some of these methods for producing butadiene involve dehydration of glycols and others involve dehydrogenation of butane. Still others involve the dehydrogenation of butenes, usually butene-2, and it is to this latter type of dehydrogenation that our present invention has particular application.

In the above-mentioned application of Kenneth K. Kearby there is disclosed a catalyst which has been found to be very effective for the dehydrogenation of butene to butadiene, and at the same time to possess a high resistance against impairment or injury by steam. The latter fact is very important because it permits the feed stock to be diluted with large volumes of superheated steam so that, in the catalytic chamber, the partial pressure of the reaction products is thus considerably lowered. It has been known that butene dehydrogenation, from the standpoint of yields, is favored by low pressures and short contact time. Prior to the work of Kenneth K. Kearby as disclosed in the aforementioned application, the practice generally had been to employ a catalyst such as chromium oxide, molybdenum oxide, and the like, and since these catalysts are sensitive to steam, the catalytic reactor was operated under greatly reduced pressure (say about 155 mm. of Hg, absolute) to prevent polymerization of the butadiene formed and other degradation products, thus very materially decreasing the yields. As indicated, however, the catalysts described in the said Kenneth K. Kearby application which, in a preferred modification, consists of the following substances in parts by weight: MgO, 78.5; Fe$_2$O$_3$, 20; CuO, 5; K$_2$O, 5; has been found to be a catalyst which is unaffected by steam, and therefore a low partial pressure of the butene undergoing dehydrogenation may be effected or maintained in the reaction zone, by diluting the butene with steam.

Our present invention involves providing means of maintaining the desired amount of K$_2$O in the catalyst composition at all times. It has been found that the above catalyst, at the high temperatures employed and after the process has been in operation for some time, tends to lose potassium oxide, and since potassium oxide is a very important component of the catalyst composition, the effectiveness of the catalyst decreases with the loss of potassium oxide. In general, our improvements in one modification involve continuously adding a potassium salt or other potassium compound to the catalyst in the reactor. Thus, we may inject a potassium compound such as K$_2$O, K$_2$CO$_3$, KOH, etc., into the feed streams entering the reactor or we may place a layer of the potassium compound in the reactor through which the feed passes before contacting the catalyst, so that as the potassium content of the catalyst is lowered by loss of the same through volatilization, etc., it is replenished by the potassium continuously brought in by the incoming feed to the catalyst mass in the reactor.

Thus the present invention is applicable to dehydrogenation catalysts that contain, as an active dehydrogenation oxide component, iron oxide promoted by a minor amount of potassium oxide.

The main object of our present invention, therefore, is to dehydrogenate butene and/or alkylated aromatics catalytically, under conditions which will maintain the activity of the catalyst and provide against the loss of potassium components from the catalyst by volatilization and the like.

Other and further objects of our invention will appear from the following more detailed description and claims.

In the accompanying drawing, we have shown diagrammatically an apparatus in which our invention may be carried into practical effect.

Referring in detail to the drawing, butene-2 is introduced into the present system through line 1, thence discharged into a heater 3 where the butene is heated to a temperature somewhat below active dehydrogenation temperatures, say a temperature of 500° F., and thence withdrawn through line 5. Meanwhile, steam from some source is introduced into the present system through line 10, thence passes through one or more superheaters 15 where the steam is heated to a temperature of from 1200–1400° F., and thence is discharged into line 5 containing the preheated butene. The mixture of steam and butene then passes into an upflow reactor 25 containing a pilled catalyst C supported on a foraminous member 26. The foraminous member carries in this modification a layer of potassium carbonate K which is interposed between the grid or other foraminous member 26 and the main body of catalyst C. The catalyst C may be of the composition previously disclosed, namely, 78.5 parts by weight of MgO, 20 parts by weight $Fe_2O_3$, 5 parts by weight CuO, and 5 parts by weight of $K_2O$. A convenient physical form of the catalyst is in pellets approximately $\frac{3}{16}$" in diameter and ¼" long. The potassium carbonate may also be of the same form and size as the dehydrogenation catalyst proper.

The mixture of steam and butene, which in a preferred modification is in the ratio of 5–15 volumes of steam per volume of hydrocarbon, passes upwardly through the reactor and is withdrawn through outlet pipe 28 and then passes quenching, cooling, solvent extraction means, fractionation by distillation, and the like, to recover a pure product in equipment not shown. Since the purification and recovery of the butadiene is known to the art and does not form the gist of the present invention, for the sake of simplicity and to focus attention on the novel features of our invention, we have omitted a showing of the known purification methods.

In order to explain more fully the novelty and utility contained in our invention, we submit the following data secured in a run in which we interposed a layer of potassium carbonate pills in the stream of butene and steam passing through the bed of catalyst as follows:

200 cc. of catalyst consisting of 78.5 MgO, 20 $Fe_2O_3$, 5 CuO, and 5 $K_2O$ were placed on top of 10 cc. of potassium carbonate pills in a reactor 25. Steam and butene in the ratio 7:1 were passed up through the catalyst bed for one hour. Following this the feed of hydrocarbon was discontinued and the bed of catalyst was treated with steam for one hour at a temperature of about 1200° F. The purpose of this steam was to regenerate the catalyst and remove coke and tarry deposits. This procedure (alternate feed of butene-steam and steaming) was repeated without interruption for a total of 324 cycles (648 hours). The butene was introduced at a rate of about 500 volumes at standard temperature and pressure per volume of catalyst per hour while the temperature was adjusted to give about 25% conversion. Following this procedure an average conversion of 27.3% with 82% selectivity was obtained in cycles 1 to 100 (period 1), 26.1% conversion and 82% selectivity in cycles 100 to 200 (period 2), 24.1% conversion and 80% selectivity in cycles 200 to 300 (period 3). The average temperatures during the periods were 1175, 1182 and 1200° F., respectively. In cycles 307, 320 and 324 conversions of 25, 25 and 24% were obtained at feed rates of 525, 575 and 600 volumes of feed per volume of catalyst per hour, when operating at 1218°, 1222° and 1217° F., respectively. These conversions correspond to about 26, 28 and 28% at a feed rate of 500 volumes of feed per volume of catalyst per hour.

In another butene dehydrogenation run in the same unit, with a catalyst consisting of 78.5 MgO, 20 $Fe_2O_3$, 5 CuO, and 5 $K_2O$ without added potassium carbonate pills, conversions of 23%, 18% and 19% were obtained in cycles 307, 315 and 323 when operating at 15 to 20° F. higher temperatures than in the run with potassium carbonate added.

In the run in which $K_2CO_3$ pills were placed below the catalyst bed, the catalyst was removed from the unit and mixed with the carbonate pills after cycle 324. Following this the process was continued for 146 more cycles, after which the catalyst again was removed from the unit for inspection. Following replacement of the catalyst, the run was continued for an additional 110 cycles—to cycle 580. A conversion of 22.6% with 81% selectivity was obtained in cycle 580 when operating at 1194° F. average catalyst temperature and a butene feed rate of 615 v./v./hr. This conversion (22.6%) corresponds to a conversion of 26.2% when operating at a feed rate of 500 v./v./hr. Summary data for these runs are shown in the table which follows.

TABLE I

*Butene dehydrogenation*

[2-hour cycles: one hour steam+butene, one hour steam alone. 3500 v./v./hr.[1] steam.]

| Run No. | 408 K | | | | | | | 407 K | | |
| --- | --- | --- | --- | --- | --- | --- | --- | --- | --- | --- |
| Catalyst | 78.5 MgO (200 cc.)+$K_2CO_3$ (10 cc.); 20 $Fe_2O_3$; 5 CuO; 5 $K_2O$ | | | | | | | 78.5 MgO (200 cc.); 20 $Fe_2O_3$; 5 CuO; 5 $K_2O$ | | |
| Cycle No. | 0–100 [2] | 100–200 [2] | 200–300 [2] | 307 | 320 | 324 | 580 | 307 | 315 | 323 |
| Butene Feed rate, v./v. hr. | 500 | 500 | 500 | 525 | 575 | 600 | 615 | 500 | 530 | 500 |
| Average Catalyst Temp., °F | 1,175 | 1,182 | 1,200 | 1,218 | 1,222 | 1,217 | 1,194 | 1,238 | 1,238 | 1,234 |
| Conversion, per cent | 27.3 | 26.1 | 24.1 | 25 | 25 | 24 | 22.6 | 23 | 17 | 19 |
| Selectivity | 82 | 82 | 80 | 80 | 79 | 78 | 81 | 80 | 79 | 79 |
| Conv. at 500 v./v./hr., per cent | 27.3 | 26.1 | 24.1 | 26 | 28 | 28 | 26.2 | 23 | 18 | 19 |

[1] Volume of feed per volume of catalyst per hour.
[2] Average in these periods.

The above data show definitely that the activity of the catalyst is maintained for a larger time when placing potassium carbonate pills at the inlet end of the catalyst bed when dehydrogenating butene over catalyst consisting of 78.5 parts by weight MgO, 20 parts by weight $Fe_2O_3$, 5 parts by weight of CuO, and 5 parts by weight of $K_2O$, in the presence of steam. Other catalysts containing volatile or slightly volatile promoters such as potassia, ceria, etc., may be kept active for a long time by placing a small amount of a slightly volatile compound of the promoter at the inlet end of the catalyst bed. The process is not limited to catalysts for butene dehydrogenation, but may be applied as well in other catalytic processes such as cracking, alkylation, isomerization, aromatization as well as in all dehydrogenation and dehydration processes in which catalysts are used which contain volatile or slightly volatile promoters.

To show the effect of placing a layer of $K_2CO_3$ in the path of the butene feed in extending the life of the catalyst, we made two runs under the same conditions, except that in one we omitted the layer of $K_2CO_3$ (K in drawing). It will be noted that at about 600 hours, in the run made without the $K_2CO_3$, the activity of the catalyst dropped sharply and at the 700 hour period, it was less than 50% of the activity of the catalyst in the run made in the reactor containing a layer of $K_2CO_3$.

TABLE II
Butene dehydrogenation

[200 cc. units—2-hour cycles; effect of $K_2CO_3$ on cat. A ¹—94.5% n-$C_4H_8$ in feed.]

| Catalyst age, hours | 532 | 562 | 578 | 594 | 626 | 642 | 658 | 674 | 706 |
|---|---|---|---|---|---|---|---|---|---|
| Catalyst temp., °F | 1,200 | 1,200 | 1,230 | 1,230 | 1,230 | 1,225 | 1,225 | 1,235 | 1,230 |
| Butene feed rate, v./v./hr | | 400 | ----- | ----- | ----- | ----- | ----- | ----- | ----- |
| Steam feed rate, v./v./hr | ---- | 4,000 | ----- | ----- | ----- | ----- | ----- | ----- | ----- |
| Per cent conversion with Cat. A | 23.1 | 26.8 | 25.8 | 23.0 | 20.7 | 20.1 | 15.9 | 18.9 | 14.5 |
| Per cent conversion with Cat. A + $K_2CO_3$ layer | 27.6 | 32.4 | 35.5 | 33.9 | 33.5 | 31.8 | 29.3 | 32.8 | 32.9 |

¹ Catalyst A = Same catalyst as used in Table I.

As indicated instead of using $K_2CO_3$, we may use $KNO_3$, $K_2SO_4$, $K_2O$, $KOH$ or any compound of potassium which will decompose into $K_2O$ or $KOH$ at elevated temperature in the presence of steam, and is volatile at dehydrogenation temperatures, as the layer K in the drawing. Also, we may inject a potassium compound into feed inlet pipe 5, during the onstream operation or into steam line 10 continuously, or employ any means to feed $K_2O$ or a compound forming $K_2O$ to the catalyst to compensate for that lost from the main catalyst bed during the process.

Many modifications of our invention will readily suggest themselves to those who are familiar with this art.

What we claim is:

1. The process of dehydrogenating butene which comprises forcing a mixture of steam and butene at temperatures of from about 1000° F. to 1400° F. through a bed of a potassium compound selected from the class consisting of potassium oxide, potassium carbonate and potassium hydroxide, where it acquires a quantity of said compound and then forcing the butene-steam mixture through a dehydrogenation catalyst consisting of MgO, $Fe_2O_3$, CuO and $K_2O$, the $Fe_2O_3$ being the active oxide, in a reaction zone and recovering butadiene from the said zone, whereby the activity of the said oxide is maintained by supplying adequate amounts of the said potassium compound to the catalyst to replace that lost in the withdrawal of said butadiene.

2. The process of dehydrogenating butene which comprises forcing a mixture of steam and butene at temperatures of from about 1000° F. to 1400° F. through a bed of a potassium compound selected from the class consisting of potassium oxide, potassium carbonate and potassium hydroxide, where it acquires a quantity of said compound, and then forcing the butene-steam mixture through a dehydrogenation catalyst consisting essentially of, in parts by weight, MgO 78.5 parts, $Fe_2O_3$ 20 parts, CuO 5 parts, and $K_2O$ 5 parts, in a reaction zone and recovering butadiene from the said zone, whereby the activity of the said oxide is maintained by supplying adequate amounts of the said potassium compound to the catalyst to replace that lost in the withdrawal of said butadiene.

3. The process of dehydrogenating butene to butadiene which comprises introducing a potassium compound selected from the class consisting of potassium oxide, potassium carbonate and potassium hydroxide into a feed stream mixture of steam and butene heated to a temperature of about 1000 to 1400° F. and then forcing the butene-steam mixture containing said potassium compound through a dehydrogenation catalyst consisting of MgO, $Fe_2O_3$, CuO and $K_2O$, the $Fe_2O_3$ being the active oxide, in a reaction zone and recovering butadiene from said zone, whereby the activity of the said oxide is maintained by supplying adequate amounts of the said potassium compound to the catalyst to replace that lost in the withdrawal of said butadiene.

4. In a process for the preparation of butadiene by dehydrogenation of butene in the presence of steam while using a catalyst composition comprising iron oxide as the active dehydrogenation catalyst and potassium oxide promoter on a magnesium oxide base, the steps of heating the steam and butene feed streams to a temperature of 1000 to 1400° F., injecting a potassium-oxide forming compound into the heated feed stream, passing the resulting steam-butene mixture containing said potassium-oxide forming compound into contact with said catalyst composition at about 1000 to 1400° F., whereby the activity of the said dehydrogenation catalyst is maintained by supplying adequate amounts of the said potassium-oxide forming compound to the catalyst to replace that lost in the withdrawal of the said butadiene.

5. In a process of dehydrogenating a hydrocarbon selected from the class consisting of butenes and alkylated aromatics in the presence of steam while using a catalyst composition comprising iron oxide as the active dehydrogenation catalyst and potassium oxide promoter on a magnesium oxide base, the steps of heating the steam and hydrocarbon feed streams to a temperature of 1000° F. to 1400° F., injecting a potassium-oxide forming compound into the heated feed stream, passing the resulting steam-hydrocarbon feed mixture containing said potassium-oxide forming compound into contact with said catalyst composition at about 1000° F. to 1400° F. whereby the activity of said dehydrogenation catalyst is maintained by supplying adequate amounts of the potassium-oxide forming compound to the catalyst to replace that lost in the withdrawal of the resulting dehydrogenated hydrocarbon.

RICHARD N. MEINERT.
HANS G. VESTERDAL.

REFERENCES CITED

The following references are of record in the file of this patent:

UNITED STATES PATENTS

| Number | Name | Date |
|---|---|---|
| 2,220,430 | Stanley | Nov. 5, 1940 |
| 2,265,641 | Grosskinsky et al. | Dec. 9, 1941 |
| 2,277,022 | McMillan et al. | Mar. 17, 1942 |
| 2,281,924 | de Simo et al. | May 5, 1942 |
| 2,301,615 | Chenicek et al. | Nov. 10, 1942 |
| 2,326,258 | Schmidt et al. | Aug. 10, 1943 |
| 2,355,831 | Voorhees | Aug. 15, 1944 |